United States Patent [19]

Bruzzone et al.

[11] Patent Number: 5,110,360
[45] Date of Patent: May 5, 1992

[54] PRODUCT CAPABLE OF INHIBITING THE CORROSION OF THE REINFORCEMENTS PRESENT IN CONCRETE OR CEMENT MORTAR AND RELATED PROCESS

[75] Inventors: Giuseppe Bruzzone, Varazze; Diego Perrone, Cogoleto; Alessandro Sperati, Cernusco sul Naviglio, all of Italy

[73] Assignee: Luigi Stoppani S.p.A., Milan, Italy

[21] Appl. No.: 613,821
[22] PCT Filed: Mar. 16, 1989
[86] PCT No.: PCT/IT89/00019
    § 371 Date: Jan. 4, 1991
    § 102(e) Date: Jan. 4, 1991
[87] PCT Pub. No.: WO90/00635
    PCT Pub. Date: Jan. 25, 1990

[30] Foreign Application Priority Data
Jul. 5, 1988 [IT] Italy ................. 21230 A/88

[51] Int. Cl.⁵ ............... C04B 22/08; E04C 5/01; C23F 11/00
[52] U.S. Cl. .................. 106/638; 106/714; 106/733; 106/738; 106/789; 501/155
[58] Field of Search ........... 501/155; 106/714, 733, 106/738, 789, 638

[56] References Cited

U.S. PATENT DOCUMENTS 2,374,562  4/1945  Owens ............................... 106/733
2,879,578  3/1959  Ulystedt.
4,504,321  3/1985  Kapland et al. ..................... 106/789

Primary Examiner—William R. Dixon, Jr.
Assistant Examiner—C. Melissa Bonner
Attorney, Agent, or Firm—Fleit, Jacobson, Cohn, Price, Holman & Stern

[57] ABSTRACT

Chromite by-products having a composition which includes $FeCr_2O_4$ as well as iron, aluminum, magnesium, sodium, calcium and silicon oxides are directly mixed with cement mortar and with the aggregates on use, or added to the water, producing the effect of corrosion inhibition of the steel reinforcements.

8 Claims, No Drawings

PRODUCT CAPABLE OF INHIBITING THE CORROSION OF THE REINFORCEMENTS PRESENT IN CONCRETE OR CEMENT MORTAR AND RELATED PROCESS

This invention deals with a product which inhibits the corrosion of reinforcements contained in concrete or cement mortar and the relative process.

The phenomenon of the corrosion of the steel of reinforced concrete is today the main worry of builders.

The steel immersed in the concrete, thanks to the strongly alkaline environment, should be protected by a passivating coat; actually in presence of perturbing external agents, with time the passivations will fail and an electrochemical process of corrosion will be started, by which oxidation products are formed at the iron-concrete interface; such products have a much greater volume, up to 6.5 times the original volume, thus producing an explosive destruction of the concrete coating of iron.

The negative effects of such a phenomenon can be specified in three different forms:
  degrading of the structure due to the progressive reduction of the sections;
  build up of internal pressures created by increasing volume due to the transformation of iron in iron oxides which may overcome the concrete's resistance to tensile stress;
  cracking corrosion under stress which leads to formations of fine cracks in the reinforcing rods, such cracks being extended perpendicularly to the axis of the rods and being invisible from the outside, these crackings being able to cause sudden and unexpected breakages.

The main agents responsible for this phenomenon seem to be carbon dioxide ($CO_2$) present in the air and the chlorides: to these the occasional facts due to particular environmental situations can be added.

The $CO_2$ causes, penetrating by diffusion or partial overpressure through the pores of the concrete, a transformation reaction of the hydroxides in carbonates:

$$Ca(OH)_2 + CO_2 \rightarrow CaCO_3 + H_2O$$

When the phenomenon reaches the steel, areas lacking protection are formed in which presumably the iron dissolves like Fe (II) and precipitates again as hydroxide, thus starting the formation of the so called rust.

The chlorides are instead present in the aggregates, in the water contained in the cast concrete and can also penetrate from the outside. When they reach the steel by diffusion they break the passivating superficial coat starting an electrochemical process in which the anode is the surface of the no longer passivated steel and the cathode is the remaining passivated surface.

Macroscopic examples of the degradation which has been described can be found in the areas where chlorinated products are used to prevent the ice formation and in areas which are in some way influenced by a sea environment.

At the present time in order to prevent this phenomenon specific additives are used which slow down the corrosion, like for example, the addition of products capable of forming a passivating coat on the steel.

U.S. Pat. No. 2,879,578 relates to a method of rustproofing concrete reinforcing elements which comprises coating the reinforcing elements with a composition containing barium chromate.

BE-A-568 543 discloses a process for the preparation of an anti-corrosive coating having to be applied on metals and comprising zinc chromate and Portland cement.

Both the cited known methods have the drawback that the protecting compositions have to be applied directly to the metal structure and further coated with a second layer: it is evident that such a method would be very expensive and time consuming and could not be industrially applied without great drawbacks and technical problems.

The aim of this invention is that of providing an inhibitor of the corrosion of the reinforcements contained in concrete or cement mortar which can be easily and economically obtained and just as easily used.

It has now been discovered that a by-product of the production of chromates is surprisingly good at inhibiting the corrosion of the reinforcements contained in concrete or cement mortar. Such a product is consisted of "exhausted chromite earths" i.e. those earths that are formed by roasting mixes containing chromite ores at high temperatures (500°–1300° C.), and a successive thermal treatment by immersion in water or aqueous solutions at room temperature (leaching).

As is commonly known, further to chromite ores such mixes can contain also other chromium III containing compounds, such as exhausted, old or broken refractories.

The positive action of this product comes from the concomitant action of various factors and does not involve processes which after some time would damage the structure of the concrete. One of the processes which presumably takes place, is the release, with the lowering of the pH, of small amounts of chromates which, reacting with the iron, form compounds of the $Cr_2O_3 \times Fe_2O_3$ type which protect the iron from a further corrosion. Furthermore it has been found that the chromite earth, if added in suitable amounts to the mixture, is capable of delaying the corrosion by at least 4 times.

The aim of the invention has been carried out by using the chromite earth as a passivator. Normally it has a weight composition included in the fields indicated below:

| | |
|---|---|
| $Fe Cr_2O_4 =$ | 9–18% |
| $Fe_2O_3 =$ | 25–35% |
| $CaO =$ | 0–30% |
| $SiO_2 =$ | 1–8% |
| $MgO =$ | 5–10% |
| $Na_2SO_4 =$ | 0–8% |
| $Al_2O_3 =$ | 1–21% |

In order to obtain such a product one usually starts from a chromium mineral added with alcalization means of the $Ca(OH)_2$ type.

As an example a starting mixture containing 2% in weight of $Ca(OH)_2$ can reach a content of transferable chromates equal to about 1.5% of the weight of the product. As has been said it is actually these chromates which inhibit the corrosion.

The product is a solid usually with granulometry under 100 microns. However there aren't particular superior limits for as far as the granulometry is concerned, but this depends on the requirements of the single client (should the production of chromates be less important with respect to the inhibitor of corrosion).

Such a product can be provided loose, to be mixed with the mixing water or with cement and the aggregate when used; or packed in sacks already mixed with the cement, as long as it doesn't react when in dry conditions. The latter solution The resulting cement mixtures to be casted will contain chromite earths in an amount within the range from 1 to 10 parts by weight on the cement weight.

EXAMPLES OF TESTS CARRIED OUT IN LABORATORIES TO SIMULATE A PROCESS OF OXIDATION AND PASSIVATION IN THE IRON

EXAMPLE 1

Corrosion tests have been carried out on a series of iron samples, each one about 100 g in stirred reactors containing a 1% HCL solution with a pH in the range between 0.5 and 1, keeping the solution weight/sample weight ratio, which is typical of corrosions.

The corrosions were made to take place at room temperature for 480 hours. The iron samples gave on average a perforation of ranging from 8.5 and 9.00 mm/year.

EXAMPLE 2

Corrosion tests have been carried out on a series of iron samples, each one about 100 g in stirred reactors containing a 1% HCL solution and containing 30% of chromite earth, keeping the solution weight/sample weight ratio of example 1. The corrosions were made to take place at room temperature for 480 hours.

The samples of iron gave on average a perforation ranging from 1.5 and 2.0 mm/year.

We claim:

1. A process to reduce the corrosion of the reinforcements contained in concrete or cement mortar, comprising the step of:

adding exhausted chromite earths derived from the production of chromates to said mortar in quantities from 1 to 10 parts by weight for 100 parts of cement.

2. The process of claim 1, wherein said exhausted chromite earths are added to mixing water.

3. The process of claim 1, wherein said exhausted chromite earths are added to aggregates.

4. A cement mixture comprising chromite exhausted earths derived from the production of chromates.

5. The cement mixture of claim 4, wherein said exhausted earths are provided within the range from about 1 to 10 parts by weight on the cement weight.

6. The cement mixture of claim 4, wherein said exhausted earths have a composition in weight within the following ranges:

| | |
|---|---|
| $Fe\,Cr_2O_4 =$ | 9–18% |
| $Fe_2O_3 =$ | 25–35% |
| $CaO =$ | 0–30% |
| $SiO_2 =$ | 1–8% |
| $MgO =$ | 5–10% |
| $Na_2SO_4 =$ | 1–8% |
| $Al_2O_3 =$ | 1–21% |

7. The cement mixture of claim 4, wherein said exhausted earths have a granulometry less than about 100 microns.

8. A process to reduce the corrosion of the reinforcements contained in concrete or cement mortar, comprising the step of:

adding exhausted chromite earths derived from the production of chromates to said mortar.

* * * * *